United States Patent
Takagi (10) Patent No.: US 9,051,856 B2
(45) Date of Patent: Jun. 9, 2015

(54) OIL-PRESSURE SUPPLY DEVICE

(71) Applicant: DENSO CORPORATION, Kariya, Aichi-pref. (JP)

(72) Inventor: Akira Takagi, Obu (JP)

(73) Assignee: DENSO CORPORATION, Kariya (JP)

( * ) Notice: Subject to any disclaimer, the term of this patent is extended or adjusted under 35 U.S.C. 154(b) by 324 days.

(21) Appl. No.: 13/750,040

(22) Filed: Jan. 25, 2013

(65) Prior Publication Data
US 2013/0192929 A1    Aug. 1, 2013

(30) Foreign Application Priority Data

Jan. 27, 2012    (JP) .................................. 2012-14888

(51) Int. Cl.
| | |
|---|---|
| *B60W 10/02* | (2006.01) |
| *B60W 10/06* | (2006.01) |
| *B60W 10/10* | (2012.01) |
| *F01M 1/02* | (2006.01) |
| *F16H 57/04* | (2010.01) |
| *F16H 61/00* | (2006.01) |

(52) U.S. Cl.
CPC .............. *F01M 1/02* (2013.01); *F16H 57/0404* (2013.01); *F16H 61/0031* (2013.01); *F16H 2061/0043* (2013.01)

(58) Field of Classification Search
CPC ............... F01M 1/02; Y10T 477/6333; Y10T 477/6403; B60W 10/023; B60W 10/06; B60W 10/10
USPC ....................................................... 477/54, 77
See application file for complete search history.

(56) References Cited

U.S. PATENT DOCUMENTS

| | | | |
|---|---|---|---|
| 6,544,142 B2 * | 4/2003 | Kobayashi ...................... 477/54 |
| 2007/0240404 A1 * | 10/2007 | Pekrul et al. .................... 60/282 |
| 2010/0163360 A1 * | 7/2010 | Fujii et al. .................... 192/3.33 |

FOREIGN PATENT DOCUMENTS

| | | |
|---|---|---|
| JP | H8-14076 | 1/1996 |
| JP | 2005-273633 | 10/2005 |

* cited by examiner

*Primary Examiner* — Edwin A Young
(74) *Attorney, Agent, or Firm* — Nixon & Vanderhye PC (57) ABSTRACT

An oil-pressure supply device includes an oil-pressure control portion, a first filtration portion which traps foreign materials in oil before a mechanical pump, a second filtration portion which traps foreign materials in oil before an electric pump, a first branch passage provided between the mechanical pump and the first filtration portion, a second branch passage provided between the electric pump and the second filtration portion, a third branch passage provided between a discharge port of the electric pump and the oil-pressure control portion, a fourth branch passage through which surplus oil is discharged, a switching portion set at a first position where the first branch passage is connected to the third branch passage when the first filtration portion is recovered, or set at a second position where the second branch passage is connected to the fourth branch passage when the second filtration portion is recovered.

16 Claims, 7 Drawing Sheets

| MODE | ENGINE STATE | PUMP STATE | | SWITCHING VALVE | EFFECT |
|---|---|---|---|---|---|
| D MODE | OPERATING | MECHANICAL PUMP | OPERATING | 2ND POSITION | 2ND STRAINER RECOVERED |
| | | ELECTRIC PUMP | NON-OPERATING | | |
| | NON-OPERATING (IDLING STOP OPERATION) | MECHANICAL PUMP | NON-OPERATING | 2ND POSITION | |
| | | ELECTRIC PUMP | OPERATING | | |
| NON-D MODE (P, R, N MODE) | OPERATING | MECHANICAL PUMP | OPERATING | 2ND POSITION | 2ND STRAINER RECOVERED |
| | | ELECTRIC PUMP | NON-OPERATING | | |
| | NON-OPERATING | MECHANICAL PUMP | NON-OPERATING | 1ST POSITION | 1ST STRAINER RECOVERED |
| | | ELECTRIC PUMP | OPERATING | | |
| | NON-OPERATING | MECHANICAL PUMP | NON-OPERATING | 1ST POSITION | |
| | | ELECTRIC PUMP | NON-OPERATING | | |

OIL-PRESSURE SUPPLY DEVICE

CROSS REFERENCE TO RELATED APPLICATION

This application is based on and incorporates herein by reference Japanese Patent Application No. 2012-014888 filed on Jan. 27, 2012.

TECHNICAL FIELD

The present disclosure relates to an oil-pressure supply device which supplies an oil pressure to an automatic transmission.

BACKGROUND

Recently, a vehicle having an automatic transmission includes an idling stop system that stops an engine of the vehicle when a transmission mode of the automatic transmission is set at a frontward-run mode and when a vehicle speed is equal to or lower than a predetermined value. The automatic transmission controls an oil pressure to control engagement or separation of a friction element by using generally a spool linear solenoid. The linear solenoid includes a spool and a sleeve accommodating the spool slidably, and a clearance between the spool and the sleeve is set lower than several tens of micrometers in order to reduce a leakage of hydraulic oil from between the spool and the sleeve. Thus, if foreign materials contained in the hydraulic oil penetrate into between the spool and the sleeve, reciprocation motion of the linear solenoid may be interrupted, and an operation of the automatic transmission may be affected.

An oil-pressure supply device which supplies an oil pressure to the automatic transmission has a strainer provided in an oil passage connecting an oil reservoir and a suction port of a pump that supplies an oil pressure to the friction element. The strainer traps foreign materials contained in the hydraulic oil. A pore size of a filter element of the strainer may be set at a few micrometers to be capable of trapping foreign materials that are to penetrate into the spool and the sleeve of the linear solenoid. However, in this case, the filter element may be clogged with the foreign materials.

Patent Document 1 (JP 2005-273633 A) discloses a method to prevent clogging of a filter element of a first strainer. An oil-pressure supply device described in Patent Document 1, pumps a hydraulic oil stored in an oil reservoir by using an oil pump and an electric pump to supply the pumped hydraulic oil to parts of an engine. The first strainer is provided in an oil passage connecting the oil reservoir and the electric pump. A second strainer is provided in a branch passage that branches from an oil passage between the oil reservoir and the first strainer, and the branch passage is connected to the oil reservoir. A flow sensor is provided in the oil passage between the oil reservoir and the first strainer to detect a flow rate of the hydraulic oil. When a flow rate of the hydraulic oil flowing through the oil passage between the oil reservoir and the first strainer is equal to or lower than a predetermined flow rate, an electronic control unit: ECU rotates the electric pump inversely to remove foreign materials trapped in the filter element of the first strainer. The removed foreign materials pass through the branch passage to be trapped by the second strainer. Accordingly, the first strainer is recovered.

A strainer used for an automatic transmission generally continues to be used in all life span of the automatic transmission. If the method of the Patent Document 1 is applied to the oil-pressure supply device of the automatic transmission, the foreign materials trapped in the second strainer cannot be removed and the second strainer may be clogged. Furthermore, the oil-pressure supply device of the Patent Document 1 includes the flow sensor and the ECU. Hence, the flow sensor and its wiring may need to be provided, and a volume of the ECU may be increased. As a result, the system may be increased in size, and its manufacturing cost may be enhanced.

An objective of the present disclosure is to provide an oil-pressure supply device that restricts clogging of a filtration portion which traps foreign materials contained in a hydraulic oil supplied to an automatic transmission.

SUMMARY

According to an aspect of the present disclosure, an oil-pressure supply device is used for supplying hydraulic oil from an oil storage portion to a friction element or a torque converter of an automatic transmission for a vehicle. The oil-pressure supply device includes an oil-pressure control portion, a mechanical pump, an electric pump, a first filtration portion, a second filtration portion, a first branch passage, a second branch passage, a third branch passage, a fourth branch passage and a switching portion. The oil-pressure control portion controls a pressure of the hydraulic oil supplied to the friction element or the torque converter. The mechanical pump is driven by an engine, and the mechanical pump has a suction port through which the hydraulic oil is drawn from the oil storage portion, and a discharge port through which the hydraulic oil is discharged to the oil-pressure control portion. The electric pump is driven by a motor, and the electric pump has a suction port through which the hydraulic oil is drawn from the oil storage portion, and a discharge port through which the hydraulic oil is discharged to the oil-pressure control portion. The first filtration portion traps foreign materials contained in the hydraulic oil drawn from the oil storage portion into the suction port of the mechanical pump. The second filtration portion traps foreign materials contained in the hydraulic oil drawn from the oil storage portion into the suction port of the electric pump. The first branch passage branches from an oil passage that connects the suction port of the mechanical pump and the first filtration portion. The second branch passage branches from an oil passage that connects the suction port of the electric pump and the second filtration portion. The third branch passage branches from an oil passage that connects the discharge port of the electric pump and the oil-pressure control portion. The fourth branch passage is a passage through which the hydraulic oil surplus in operation of the friction element or the torque converter is discharged. The switching portion is configured to be set at a first position where the switching portion connects the first branch passage to the third branch passage and separates the second branch passage from the fourth branch passage, or be set at a second position where the switching portion connects the second branch passage to the fourth branch passage and separates the first branch passage from the third branch passage. The switching portion is set at the first position when the first filtration portion is recovered, and is set at the second position when the second filtration portion is recovered.

When the switching portion is set at the first position, the hydraulic oil discharged from the electric pump flows through the third branch passage and the first branch passage into the first filtration portion. Accordingly, the foreign materials trapped by the first filtration portion can be removed, and the first filtration portion can be thereby recovered. When the switching portion is set at the second position, the hydraulic oil surplus in operation of the friction element or the torque converter flows through the fourth branch passage and the second branch passage into the second filtration portion. Accordingly, the foreign materials trapped by the second filtration portion can be removed, and the second filtration portion can be thereby recovered. Therefore, clogging of both the first filtration portion of the mechanical pump and the second filtration portion of the electric pump can be restricted.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
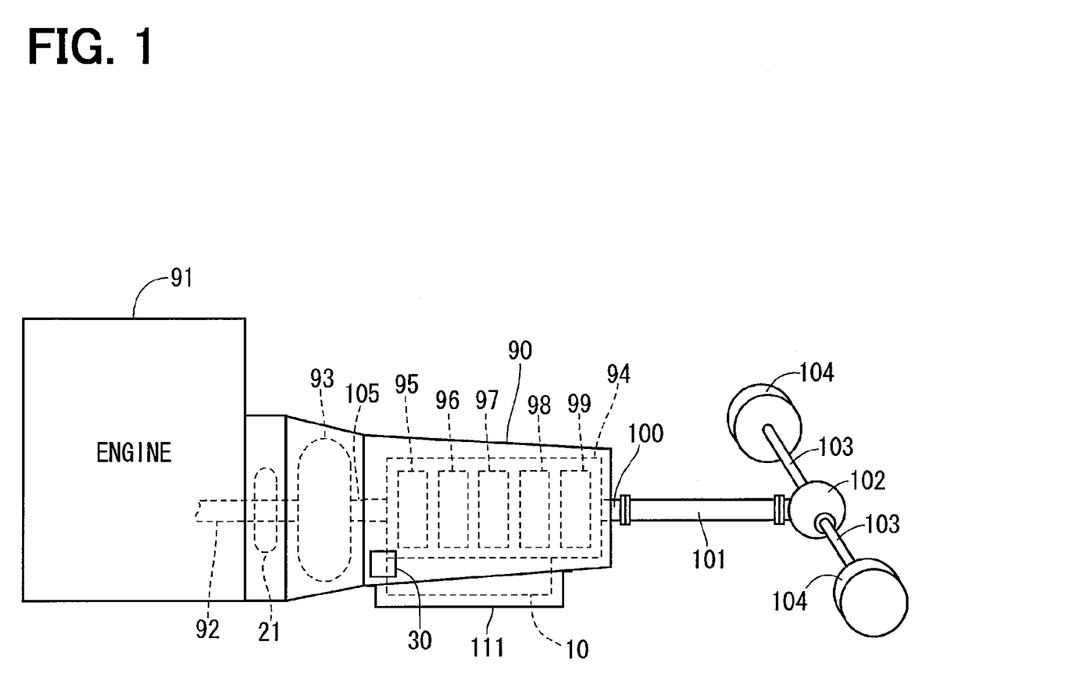
FIG. 1 is a schematic diagram showing a drive unit for a vehicle, which includes an automatic transmission provided with an oil-pressure supply device according to a first embodiment of the present disclosure.

In a first embodiment of the present disclosure, a drive unit for a vehicle, shown in FIG. 1, includes an automatic transmission 90 provided with an oil-pressure supply device 10. An idling stop system is used in the drive unit. The idling stop system performs an idling stop operation in which an engine 91 is controlled to be stopped, when a transmission mode is set at a frontward-run mode and when a vehicle speed is equal to or lower than a predetermined value. The automatic transmission 90 is a multistage transmission that includes a torque converter 93 connected to a crank shaft 92 of the engine 91, a planetary-gear transmission mechanism 94 and the oil-pressure supply device 10. The transmission mechanism 94 includes multiple planetary gears and hydraulic friction elements 95 to 99. The friction elements 95 to 99 transmit torque of rotation element such as a sun gear, a carrier and a ring gear of the planetary gear to another rotation element of the planetary gear or to a transmission case, for example. The friction elements 95 to 99 include frontward-run friction elements 96 to 99 and a backward-run friction element 95. The friction elements 95 to 99 may be made of wet multiple-disc clutches or wet multiple-disc brakes, for example. The automatic transmission 90 controls engagement or separation of the friction elements 95 to 99, thereby switching a power transfer pathway between a turbine shaft 105 of the torque converter 93 and an output shaft 100. Accordingly, either one of multiple speeds (gears) is selected. The output shaft 100 of the automatic transmission 90 is connected to drive wheels 104 via a propeller shaft 101, a differential gear 102 and drive shafts 103.

Figure 2:
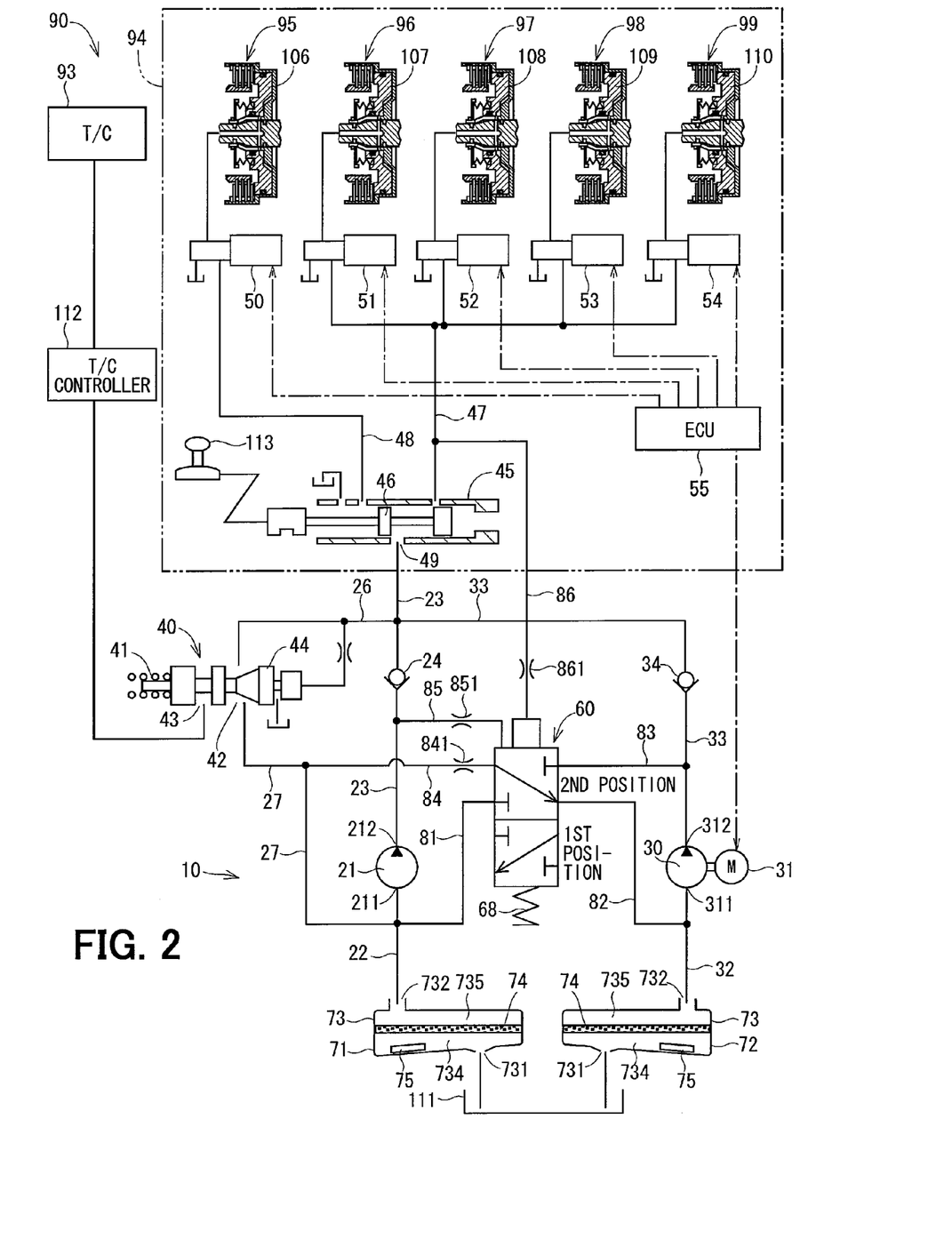
FIG. 2 is a schematic diagram showing the automatic transmission provided with the oil-pressure supply device according to the first embodiment.

As shown in FIG. 2, hydraulic oil, which is pumped from an oil pan 111, is supplied to hydraulic pistons 106 to 110 of the friction elements 95 to 99 and to the torque converter 93 (T/C) by the oil-pressure supply device 10. The oil pan 111 may be used as an example of an oil storage portion which stores the hydraulic oil therein. The oil-pressure supply device 10 includes a mechanical pump 21, an electric pump 30, a line-pressure control valve 40, a converter control portion 112 (T/C controller), a manual valve 45 and a switching valve 60 (switching portion). The manual valve 45 may be used as an example of a mode selection portion that is operated by a driver to select the transmission mode of the automatic transmission. The line-pressure control valve 40 and the converter control portion 112 may be used as examples of an oil-pressure control portion which controls a pressure of the hydraulic oil supplied to the friction element 95 to 99 or the torque converter 93. The line-pressure control valve 40 may be used as an example of a line-pressure control portion which controls a pressure of the hydraulic oil supplied to the friction elements.

The mechanical pump 21 is driven in accordance with rotation of the engine 91. The hydraulic oil is stored in the oil pan 111, and the mechanical pump 21 pumps thereinto hydraulic oil through a first suction passage 22. The mechanical pump 21 pressurizes therein the hydraulic oil drawn through a suction port 211 connected to the first suction passage 22 to discharge the hydraulic oil via a discharge port 212 to a first discharge passage 23. The first discharge passage 23 connects the discharge port 212 of the mechanical pump 21 and an introduction port 49 of the manual valve 45. The hydraulic oil discharged from the mechanical pump 21 passes through the first discharge passage 23 to be supplied to the introduction port 49 of the manual valve 45. A check valve 24 is provided in the first discharge passage 23 to allow a flow of the hydraulic oil from the mechanical pump 21 to the manual valve 45 and to block a flow of the hydraulic oil from the manual valve 45 to the mechanical pump 21.

The electric pump 30 is driven by a motor 31 that receives electric current from an electronic control unit 55 (ECU) to rotate. The electric pump 30 draws the hydraulic oil from the oil pan 111 through a second suction passage 32. The electric pump 30 pressurizes therein the hydraulic oil drawn through a suction port 311 connected to the second suction passage 32 to discharge the pressurized hydraulic oil through a discharge port 312 to a second discharge passage 33. The second discharge passage 33 connects the discharge port 312 of the electric pump 30 and a part of the first discharge passage 23 located between the check valve 24 and the manual valve 45. The hydraulic oil discharged from the electric pump 30 passes through the second discharge passage 33 and the first discharge passage 31, thereby being supplied to the introduction port 49 of the manual valve 45. A check valve 34 is provided in the second discharge passage 33 to allow a flow of the hydraulic oil from the electric pump 30 to the manual valve 45 and to block a flow of the hydraulic oil from the manual valve 45 to the electric pump 30.

A first strainer 71 is provided in the first suction passage 22, and a second strainer 72 is provided in the second suction passage 32. The first strainer 71 may be used as an example of a first filtration portion which traps foreign materials contained in the hydraulic oil drawn from the oil storage portion into the mechanical pump. The second strainer 72 may be used as an example of a second filtration portion which traps foreign materials contained in the hydraulic oil drawn from the oil storage portion into the electric pump. The first strainer 71 traps foreign materials contained in the hydraulic oil drawn into the mechanical pump 21 from the oil pan 111. The first strainer 71 includes a casing 73, a filter element 74 and an unwoven fabric 75. The unwoven fabric 75 may be used as an example of a foreign-material adsorption portion. A magnet may be used as an example of the foreign-material adsorption portion. The casing 73 has an oil inlet portion 731 that communicates with the oil pan 111, and an oil outlet portion 732 that communicates with the suction port 211 of the mechanical pump 21. The filter element 74 is made of metallic mesh or unwoven fabric, and is provided in the casing 73. The filter element 74 is located to partition an inside space of the casing 73 into a dirty fluid room 734 adjacent to the oil inlet portion 731 and a clean fluid room 735 adjacent to the oil outlet portion 732. The filter element 74 traps foreign materials contained in the hydraulic oil flowing from the dirty fluid room 734 to the clean fluid room 735. A pore size of the filter element 74 is set smaller than clearances between spools and sleeves of linear solenoids 50 to 54. For example, the pore size of the filter element 74 is set at a few micrometers. The unwoven fabric 75 is provided in the dirty fluid room 734, and is located at or adjacent to a position directly under the oil outlet portion 732, so that foreign materials removed from the filter element 74 adsorbs to the unwoven fabric 75. The second strainer 72 traps foreign materials contained in the hydraulic oil drawn into the electric pump 30 from the oil pan 111. The second strainer 72 has a similar structure to that of the first strainer 71, and an explanation about the second strainer 72 is thereby omitted.

The line-pressure control valve 40 is a pilot pressure-adjustment valve, and is connected to a line branch passage 26 that branches from a part of the first discharge passage 23 located between the check valve 24 and the manual valve 45. The line-pressure control valve 40 adjusts a line pressure that is a pressure of the hydraulic oil supplied to the manual valve 45. A target value of the line pressure is set based on a running state of the vehicle at a necessary value to operate the hydraulic pistons 106 to 110 of the friction elements 95 to 99. The line-pressure control valve 40 adjusts the line pressure, for example, such that the larger load of the engine 91, the higher the line pressure becomes. A spool 44 of the line-pressure control valve 40 is moved to be located at a position, where an urging force of a spring 41, a pressure of the hydraulic oil in the line branch passage 26 branching from the first discharge passage 23, and a pressure of hydraulic oil discharged from an electromagnetic valve are balanced. Accordingly, the spool 44 causes a first relief port 42 to be opened or closed. The pressure of the hydraulic oil discharged from the electromagnetic valve is controlled to increase or decrease in accordance with the load of the engine 91. When a pressure of the hydraulic oil discharged from the mechanical pump 21 or the electric pump 30 is higher than the target value of the line pressure, hydraulic oil surplus in operation of the friction elements 95 to 99 and the torque converter 93 is discharged from the first relief port 42 to the oil pan 111 through a return passage 27.

Figure 4:
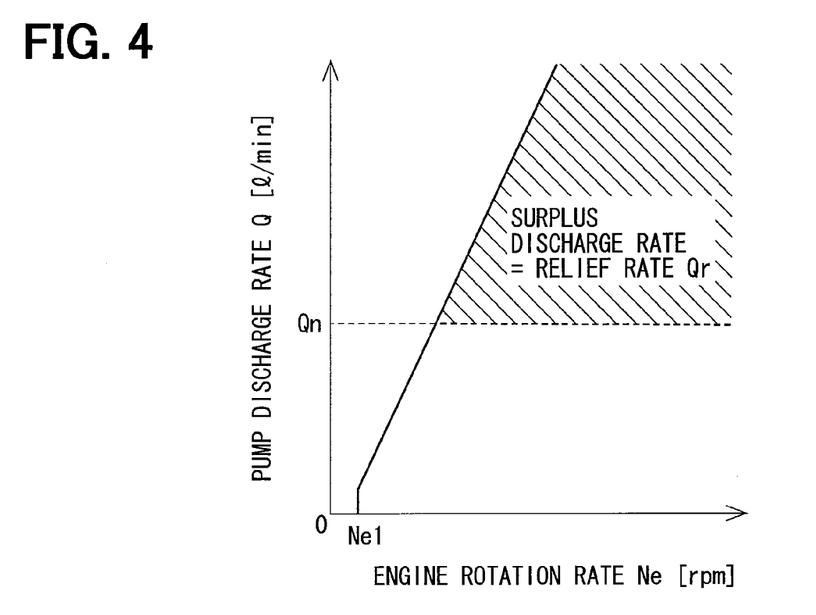
FIG. 4 is a diagram showing a relationship between an engine rotation rate and a pump discharge rate in the oil-pressure supply device according to the first embodiment.

As shown in FIG. 4, a pump discharge rate Q that is a flow rate of the hydraulic oil discharged from the mechanical pump 21 increases in proportion to an engine rotation rate Ne above a predetermined rotation rate Ne1. In a predetermined running state of the vehicle, a discharge rate necessary for setting the line pressure at the target value is referred to as a necessary flow rate Qn. A relief rate Qr is a surplus discharge rate obtained by subtracting the necessary discharge rate Qn from the pump discharge rate Q when the pump discharge rate Q is higher than the necessary flow rate Qn. The hydraulic oil discharged from the first relief port 42 flows through the return passage 27 into the oil pan 111. The hydraulic oil discharged from a second relief port 43 of the line-pressure control valve 40 is supplied to the torque converter 93 via the converter control portion 112.

A select lever 113 is operated by a driver of the vehicle to be positioned at one of four positions, for example. The four positions are a D position for running frontward in a drive mode (D mode, frontward-run mode), a P position for parking in a parking mode (P mode), an R position for running backward in a reverse mode (R mode), and an N position for disconnecting power transmission in a neutral mode (N mode). A spool 46 of the manual valve 45 is connected mechanically or electrically to the select lever 113 to be operated depending on a position of the select lever 113. When the select lever 113 is located at the D position, the manual valve 45 connects the first discharge passage 23 to a frontward-run passage 47, and disconnects the first discharge passage 23 from a backward-run passage 48. In this case, the hydraulic oil in the first discharge passage 23 and the second discharge passage 33 can be supplied through the frontward-run passage 47 to the linear solenoids 51 to 54 that correspond respectively to the frontward-run friction elements 96 to 99. The frontward-run friction elements 96 to 99 are friction elements that are used for setting frontward gears by receiving supply of the hydraulic oil via the frontward-run passage 47. When the select lever 113 is located at the R position, the manual valve 45 connects the first discharge passage 23 to the backward-run passage 48, and disconnects the first discharge passage 23 from the frontward-run passage 47. In this case, the hydraulic oil in the first discharge passage 23 and the second discharge passage 33 can be supplied through the backward-run passage 47 to the linear solenoid 50 that corresponds to the backward-run friction element 95. When the select lever 113 is located at the P position or the N position, the manual valve 45 disconnects the first discharge passage 23 from both the frontward-run passage 47 and the backward-run passage 48. The select lever 113 may be used as an example of the mode selection portion.

The linear solenoids 51 to 54 correspond respectively to the frontward-run friction elements 96 to 99. It is predetermined in each of the frontward gears which the frontward-run friction elements 96 to 99 to be engaged. The linear solenoid 50 corresponds to the backward-run friction element 95. The linear solenoids 50 to 54 are hydraulic spool valves capable of changing a discharge pressure continuously. Each of the linear solenoids 50 to 54 generates an electromagnetic thrust force dependent on a current value supplied from the ECU 55. The discharge pressure of each linear solenoid 50 to 54 is controlled based on balance between the generated electromagnetic thrust force and a static hydraulic force introduced from an output oil pressure. A clearance between a spool and a sleeve of each linear solenoid 50 to 54 is set equal to or lower than several tens of micrometers in order to reduce a leakage of the hydraulic oil for improvement in accuracy of a hydraulic control. Here, the sleeve of each linear solenoid 50 to 54 accommodates the spool slidably inside the sleeve. The linear solenoids 50 to 54 adjust a pressure of the hydraulic oil supplied from the manual valve 45 through the frontward-run passage 47 or the backward-run passage 48. The linear solenoids 50 to 54 are capable of supplying the hydraulic oil to the hydraulic pistons 106 to 110 of the friction elements 95 to 99. The hydraulic pistons 106 to 110 are operated by the hydraulic oil supplied from the linear solenoids 50 to 54 so that the friction elements 95 to 99 are engaged or separated.

Figure 3:
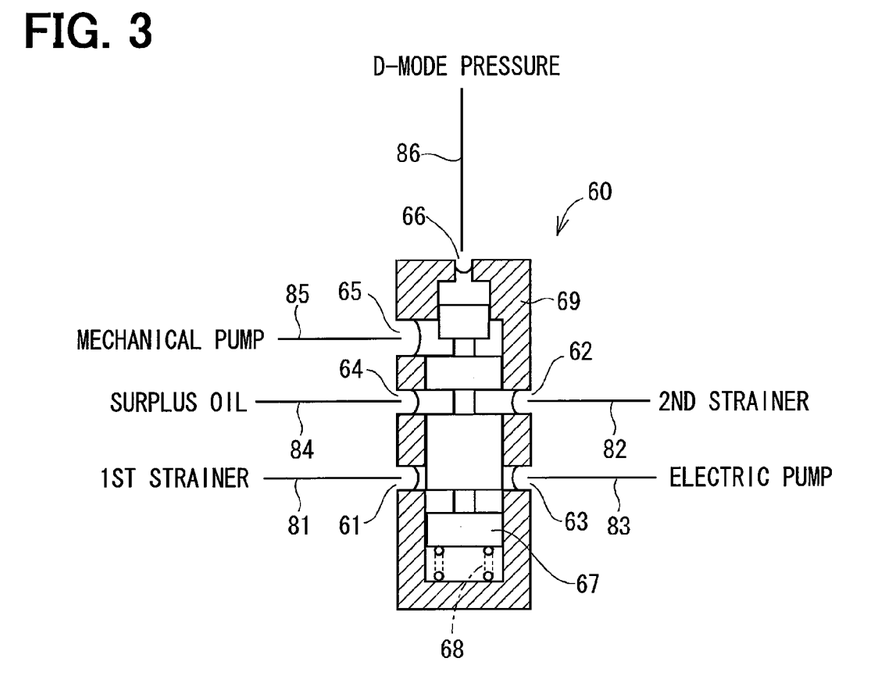
FIG. 3 is a sectional schematic diagram showing a switching valve of the oil-pressure supply device according to the first embodiment.

As shown in FIG. 2, the switching valve 60 can be set at a first position or a second position. Specifically, as shown in FIG. 3, the switching valve 60 includes a sleeve 69 having first to sixth ports 61 to 66, and a spool 67 provided slidably inside the sleeve 69. The spool 67 of the switching valve 60 can be positioned at the first position or the second position, so that an oil passage through the switching valve 60 is switched. In FIGS. 2 and 3, the switching valve 60 is set at the second position, in other words, the spool 67 is positioned at the second position. A first branch passage 81 branches from the first suction passage 22 connecting the suction port 211 of the mechanical pump 21 and the first strainer 71, and the first branch passage 81 is connected to the first port 61 of the switching valve 60. A second branch passage 82 branches from the second suction passage 32 connecting the suction port 311 of the electric pump 30 and the second strainer 72, and the second branch passage 82 is connected to the second port 62 of the switching valve 60. A third branch passage 83 branches from the second discharge passage 33 connecting the discharge port 312 of the electric pump 30 and the check valve 34, and the third branch passage 83 is connected to the third port 63 of the switching valve 60. A fourth branch passage 84 branches from the return passage 27 connecting the first relief port 42 of the line-pressure control valve 40 and the first suction passage 22, and the fourth branch passage 84 is connected to the fourth port 64 of the switching valve 60.

A fifth branch passage 85 branches from the first discharge passage 23 connecting the discharge port 212 of the mechanical pump 21 and the check valve 24, and the fifth branch passage 85 is connected to the fifth port 65 of the switching valve 60. A sixth branch passage 86 branches from the frontward-run passage 47 to be connected to the sixth port 66 of the switching valve 60. Orifices 851 and 861 are provided respectively in the fifth and sixth branch passages 85 and 86 to restrict a flow rate of the hydraulic oil introduced into the switching valve 60.

Oil pressures in the fifth and sixth ports 65, 66 and an urging force from a spring 68 that urges the spool 67 are balanced each other in the switching valve 60, so that the switching valve 60 is set at the first position or the second position. Specifically, as shown in FIG. 3, the switching valve 60 is set at the second position when a sum of pressure forces of hydraulic oils flowing from the fifth and sixth branch passages 85, 86, which press the spool 67 toward the spring 68, is equal to or higher than the urging force of the spring 68 that presses the spool 67 toward the sixth port 66. The switching valve 60 is set at the first position when the sum of the pressure forces that press the spool 67 toward the spring 68 is lower than the urging force of the spring 68.

When the switching valve 60 is set at the second position as shown in FIG. 3, the first port 61 is shut off from the third port 63, and the second port 62 is in communication with the fourth port 64. In this case, the hydraulic oil flows from the fourth branch passage 84 to the second branch passage 82, and foreign materials trapped in the filter element 74 of the second strainer 72 are removed from the filter element 74 to adsorb to the unwoven fabric 75 provided in the dirty fluid room 734 of the second strainer 72. When the switching valve 60 is set at the first position, the first port 61 is in communication with the third port 63, and the second port 62 is shut off from the fourth port 64. In this case, the hydraulic oil flows from the third branch passage 83 to the first branch passage 81, foreign materials trapped in the filter element 74 of the first strainer 71 are removed from the filter element 74 to adsorb to the unwoven fabric 75 provided in the dirty fluid room 734 of the first strainer 71. The switching valve 60 may be used as an example of the switching portion that is set at the first position, where the switching portion connects the first branch passage 81 to the third branch passage 83 and disconnects the second branch passage 82 from the fourth branch passage 84, or at the second position, where the switching portion connects the second branch passage 82 to the fourth branch passage 84 and disconnects the first branch passage 81 from the third branch passage 83.

An orifice 841 is provided in the fourth branch passage 84. The orifice 841 may be used as an example of a flow-rate restriction portion which restricts a flow rate of the hydraulic oil flowing from the fourth branch passage through the switching portion and the second branch passage to the second filtration portion. The hydraulic oil surplus in operation of the friction elements 95 to 99 and the torque converter 93 flows from the line-pressure control valve 40 to the fourth branch passage 84 through the return passage 27, and the orifice 841 restricts a flow rate of the hydraulic oil flowing through the fourth branch passage 84. An opening area of the orifice 841 is set to restrict the flow rate of the hydraulic oil such that the filter element 74 of the second strainer 72 is not damaged by a dynamic pressure of the hydraulic oil flowing from the fourth branch passage 84 through the second branch passage 82 into the second strainer 72. Alternatively, the orifice 841 may be provided in the second branch passage 82.

Figure 5:
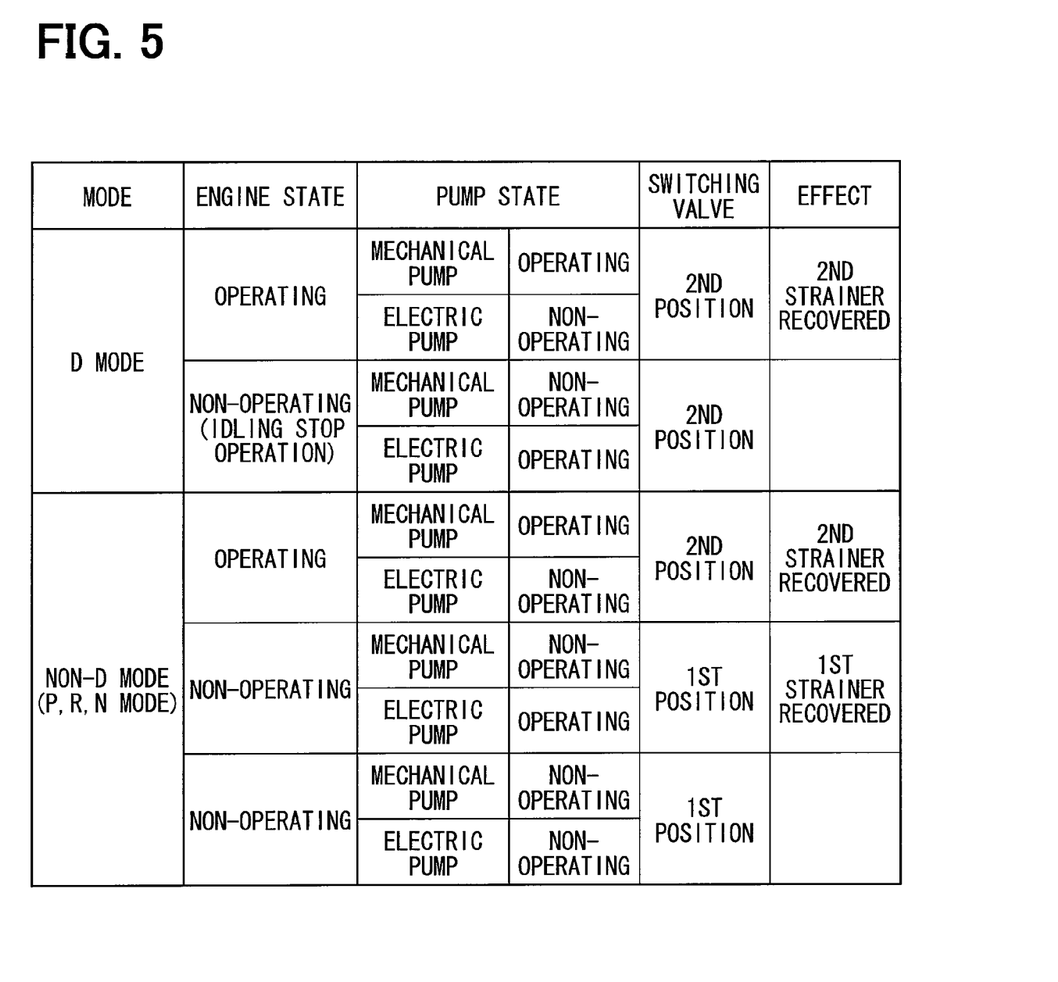
FIG. 5 is a diagram showing an operation of the oil-pressure supply device according to the first embodiment.

Next, an operation of the oil-pressure supply device 10 of the present embodiment will be described in reference to FIG. 5. When the D mode is selected by locating the select lever 113 at the D position, and when the engine 91 is in operation (operating), the mechanical pump 21 is operated in conjunction with the engine 91, and the electric pump 30 is stopped (non-operating). In this case, a discharge pressure of the mechanical pump 21 is introduced into the switching valve 60 through the fifth branch passage 85, and a D-mode pressure that is an oil pressure in the frontward-run passage 47 is introduced into the switching valve 60 through the sixth branch passage 86. Hence, the switching valve 60 is set at the second position. A part of hydraulic oil discharged from the mechanical pump 21, which is surplus in operation of the friction elements 95 to 99 or the torque converter 93, flows into the second strainer 72 through the fourth branch passage 84 and the second branch passage 82 to recover the second strainer 72.

When the D mode is selected, and when the engine 91 is stopped (non-operating) due to the idling stop operation, the mechanical pump 21 is also stopped (non-operating). The ECU 55 actuates the electric pomp 30 before the engine 91 is stopped due to the idling stop operation. Thus, oil pressures applied on the frontward-run friction elements 96 to 99 can be kept due to the discharge pressure of the electric pump 30 in the idling stop operation. An oil pressure in the fifth branch passage 85 decreases, but the D-mode pressure in the sixth branch passage 86 is introduced into the switching valve 60, so that the switching valve 60 is set at the second position. The discharge pressure of the electric pump 30 is used for keeping the frontward-run friction elements 96 to 99 engaged in this case. Hence, an amount of the hydraulic oil surplus in operation of the friction elements 95 to 99 or the torque converter 93 may be small, and the second strainer 72 may not be thereby recovered.

When the P, R, or N mode other than the D mode is selected, and when the engine 91 is in operation, the mechanical pump 21 is operated with the operation of the engine 91, and the electric pump 30 is stopped. In this case, the D-mode pressure in the sixth branch passage 86 decreases, but the discharge pressure of the mechanical pump 21 in the fifth branch passage 85 is introduced into the switching valve 60. Thus, the switching valve 60 is set at the second position. A part of hydraulic oil discharged from the mechanical pump 21, which is surplus in operation of the friction elements 95 to 99 or the torque converter 93, flows into the second strainer 72 through the fourth branch passage 84 and the second branch passage 82 to recover the second strainer 72.

When the P, R, or N mode other than the D mode is selected, and when the engine 91 is stopped, the mechanical pump 21 is stopped. In this case, the oil pressures in the fifth branch passage 85 and the sixth branch passage 86 decrease, and the switching valve 60 is thereby set at the first position. When the ECU 55 drives the electric pump 30 in this case, hydraulic oil discharged from the electric pump 30 to the second discharge passage 33 flows into the first strainer 71 through the third branch passage 83 and the first branch passage 81 to recover the first strainer 71. Here, the ECU 55 closes the line-pressure control valve 40 as necessary. The ECU 55 may drive the electric pump 30 only when the first strainer 71 is recovered. The ECU 55 starts the recovery of the first strainer 71, for example, when the mechanical pump 21 is operated for a predetermined time period or more, or when a flow rate sensor detects a decrease of the flow rate of hydraulic oil flowing in the first suction passage 22 or the first discharge passage 23. The ECU 55 may stop energization of the electric pump 30 when the recovery of the first strainer 71 is finished or is not required. Accordingly, a fuel consumption in operation of the electric pump 30 can be reduced.

Effects in the first embodiment will be described below.

(1) In the first embodiment, when the switching valve 60 is set at the first position, the hydraulic oil discharged from the electric pump 30 flows through the third branch passage 83 and the first branch passage 81 into the first strainer 71. Accordingly, foreign materials trapped in the filter element 74 of the first strainer 71 can be removed from the filter element 74 so that the first strainer 71 is recovered. On the other hand, when the switching valve 60 is set at the second position, the hydraulic oil surplus in operation of the friction elements 95 to 99 or the torque converter 93 flows through the fourth branch passage 84 and the second branch passage 82 into the second strainer 72. Accordingly, foreign materials trapped in the filter element 74 of the second strainer 72 can be removed from the filter element 74 so that the second strainer 72 is recovered. As a result, the oil-pressure supply device 10 is capable of restricting clogging of the filter elements 74 of both the first and second strainers 71 and 72.

(2) The oil-pressure supply device 10 recovers the second strainer 72 by using the hydraulic oil that is surplus in operation of the friction elements 95 to 99 or the torque converter 93 when the mechanical pump 21 is operated by the engine 91. Therefore, the second strainer 72 can be recovered without reduction of fuel efficiency. Moreover, the oil-pressure supply device 10 does not recover the second strainer 72 in a case where the surplus hydraulic oil is not discharged even when the mechanical pump 21 is operated by the engine 91. Therefore, an original function of the automatic transmission 90 can be prevented from deteriorating.

(3) In the first embodiment, when the D mode is selected, and when the engine 91 is stopped due to the idling stop operation, the switching valve 60 is set at the second position by an oil pressure in the sixth branch passage 86 that branches from the frontward-run passage 47. Accordingly, in the oil-pressure supply device 10, the hydraulic oil discharged from the electric pump 30 is not used in the recovery of the first strainer 71 in the idling stop operation. Therefore, the oil pressure supplied to the frontward-run friction elements 96 to 99 can be kept during the idling stop operation.

(4) In the first embodiment, when a mode other than the D mode is selected, and when the engine 91 is stopped, the switching valve 60 is set at the first position. In this case, the ECU 55 can drive the electric pump 30 only when the recovery of the first strainer 71 is required. Accordingly, the fuel consumption in the operation of the electric pump 30 can be reduced.

(5) In the first embodiment, a pressure of the hydraulic oil discharged from the mechanical pump 21 is introduced into the switching valve 60 through the fifth branch passage 85, and a pressure of the hydraulic oil supplied to the frontward-run friction elements 96 to 99 is introduced into the switching valve 60 through the sixth branch passage 86. The switching valve 60 is set at the second position when at least one of oil pressures in the fifth and sixth branch passages 85, 86 is higher than a predetermined pressure. The switching valve 60 is set at the first position when the oil pressures in the fifth and sixth branch passages 85, 86 are lower than a predetermined pressure. Therefore, there is no need to provide an ECU for controlling switching of the switching valve 60, and the switching valve 60 can be thereby controlled simply. Alternatively, the switching valve 60 may be set at the second position when a sum of oil pressures in the fifth and sixth branch passages 85, 86 is equal to or higher than a reference pressure. The switching valve 60 may be set at the first position when the sum of the oil pressures in the fifth and sixth branch passages 85, 86 is lower than the reference pressure.

(6) In the first embodiment, by providing the orifice 841 in the fourth branch passage 84, the filter element 74 or the like of the second strainer 72 can be prevented from being damaged by a dynamic pressure of the hydraulic oil when a flow rate of the hydraulic oil, which is surplus in operation of the friction elements 95 to 99 or the torque converter 93, is increased.

(7) In the first embodiment, foreign materials removed from the filter element 74 are adsorbed to the unwoven fabrics 75 in the first and second strainers 71, 72. Accordingly, the foreign materials, which are removed from the filter element 74 in the recovery of the first and second strainers 71, 72, can be prevented from being trapped by the filter element 74 again.

Second Embodiment

Figure 6:
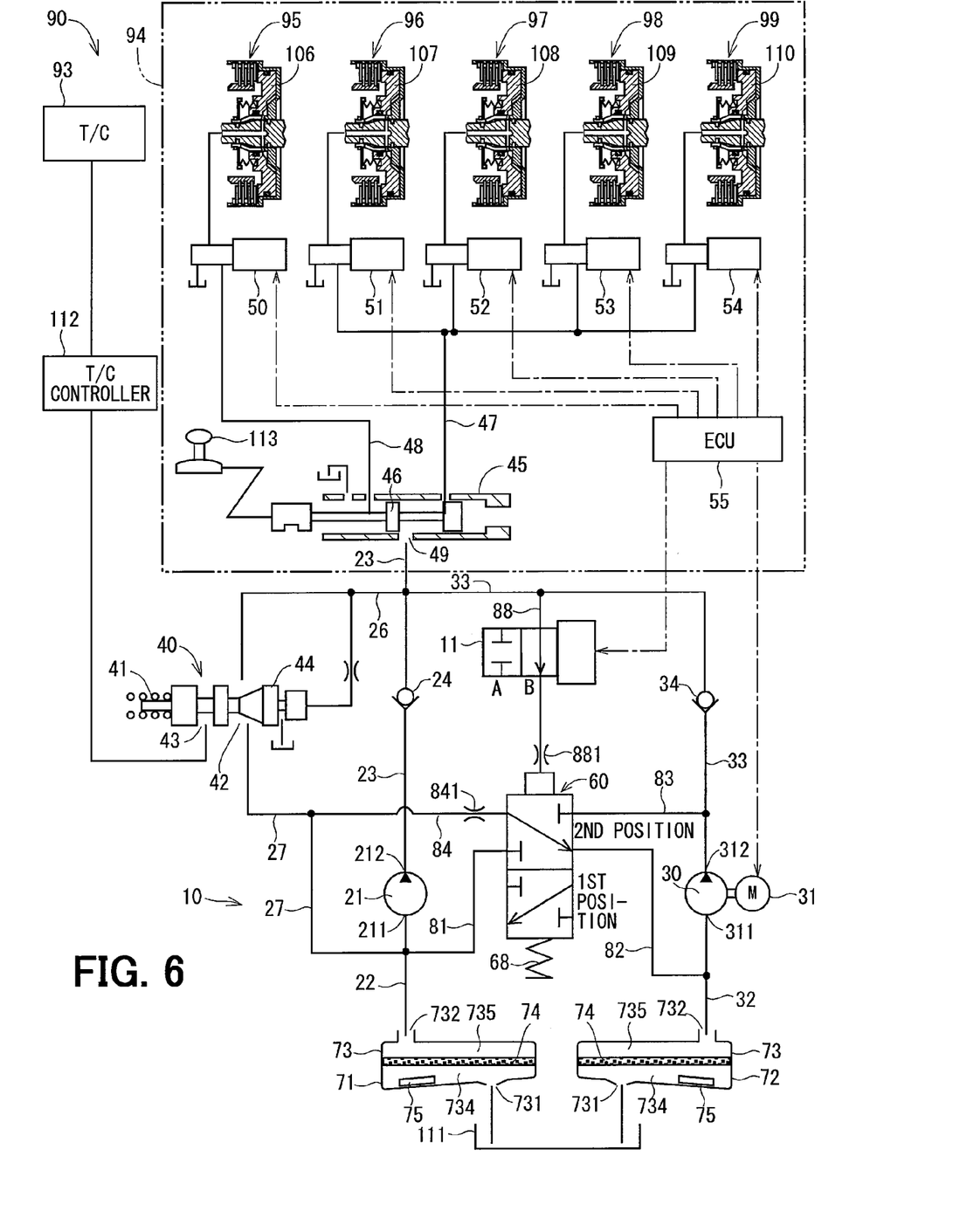
FIG. 6 is a schematic diagram showing an automatic transmission provided with an oil-pressure supply device according to a second embodiment of the present disclosure.

A second embodiment of the present disclosure will be described referring to FIG. 6. In following embodiments, components substantially same as components of the above-described first embodiment are assigned the same numerals as the components of the first embodiment, and explanations of the substantially same components are omitted. In the second embodiment, an eighth branch passage 88 is provided in an oil-pressure supply device 10 instead of the fifth branch passage 85 and the sixth branch passage 86 described in the first embodiment. The eighth branch passage 88 connects a sixth port 66 of a switching valve 60 and a part of a second discharge passage 33 located between a check valve 34 and a manual valve 45 in a flow direction of hydraulic oil in the second discharge passage 33. Alternatively, the eighth branch passage 88 may connect the sixth port 66 of the switching valve 60 and a part of a first discharge passage 23 located between a check valve 24 and the manual valve 45 in a flow direction of the hydraulic oil in the first discharge passage 23. In the present embodiment, the fifth port 65 described in the first embodiment is not provided. The switching valve 60 set at a first position or a second position depending on a force balance between an oil pressure introduced into the sixth port 66 and an urging force of a spring 68 that urges a spool 67. Specifically, the switching valve 60 is set at the second position when the oil pressure supplied from the eighth branch passage 88, which presses the spool 67 toward the spring 68, is equal to or higher than the urging force of the spring 68 that presses the spool 67 toward the sixth port 66. When the oil pressure supplied from the eighth branch passage 88 is lower than the urging force of the spring 68, the switching valve 60 is set at the first position. An orifice 881 is provided in the eighth branch passage 88 to restrict a flow rate of the hydraulic oil flowing into the switching valve 60.

A hydraulic solenoid 11 is provided in the eighth branch passage 88. The hydraulic solenoid 11 is actuated by electric power supplied from the ECU 55 so as to be positioned at a position A or a position B shown in FIG. 6. When the hydraulic solenoid 11 is positioned at the position B as shown in FIG. 6, the hydraulic solenoid 11 allows the hydraulic oil to flow through the eighth branch passage 88. When the hydraulic solenoid 11 is positioned at the position A, the hydraulic solenoid 11 blocks the flow of the hydraulic oil through the eighth branch passage 88. When the D mode is selected, or when the engine 91 is in operation, the ECU 55 set the hydraulic solenoid 11 at the position B. Accordingly, the hydraulic oil discharged from the mechanical pump 21 or the electric pump 30 is introduced into the switching valve 60 through the eighth branch passage 88. In other words, an oil pressure of the hydraulic oil flowing through the eighth branch passage 88 is introduced into the switching valve 60. Due to the oil pressure from the eighth branch passage 88, the switching valve 60 is set at the second position. In this case, when the hydraulic oil, which is surplus in operation of friction elements 95 to 99 and a torque converter 93, flows through a fourth branch passage 84, a second strainer 72 is recovered. On the other hand, when a mode other than the D mode is selected, and when the engine 91 is stopped, the ECU 55 set the hydraulic solenoid 11 at the position A. Accordingly, the flow of the hydraulic oil in the eighth branch passage 88 is blocked, and the oil pressure in the eighth branch passage 88 thereby decreases, so that the switching valve 60 is set at the first position. In this case, when the electric pump 30 is driven by the ECU 55, the first strainer 71 is recovered.

In the second embodiment, switching of the switching valve 60 can be controlled in a simple structure having the eighth branch passage 88 and the hydraulic solenoid 11 without providing the fifth branch passage 85 and the sixth branch passage 86.

Third Embodiment

Figure 7:
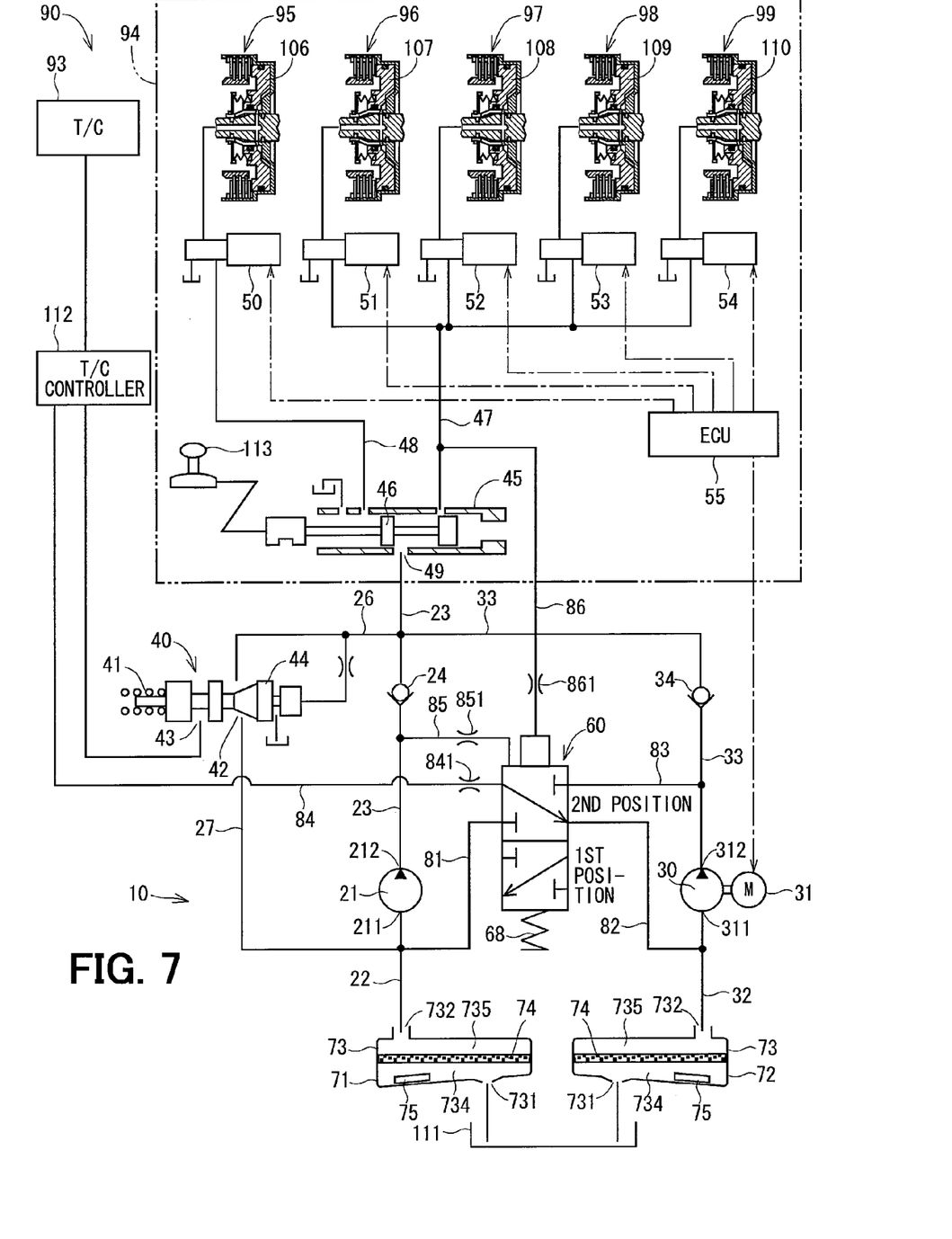
FIG. 7 is a schematic diagram showing an automatic transmission provided with an oil-pressure supply device according to a third embodiment of the present disclosure.

A third embodiment of the present disclosure will be described with reference to FIG. 7. In the third embodiment, a fourth branch passage 84 is connected to a converter control portion 112 (T/C controller). Hydraulic oil that is surplus in control of torque converter 93 flows through the fourth branch passage 84 into a fourth port 64 of a switching valve 60. In the third embodiment, a second strainer 72 is recovered by the hydraulic oil surplus in the control of the torque converter 93 when a mechanical pump 21 is driven by an engine 91. Hence, in an oil-pressure supply device 10 of the third embodiment, the second strainer 72 can be recovered without decrease of fuel efficiency. Moreover, even in a case where the mechanical pump 21 is operated by the engine 91, the recovery of the second strainer 72 is not performed in the oil-pressure supply device 10 when the hydraulic oil surplus in the control of the torque converter 93 is not discharged. Therefore, an original function of the automatic transmission 90 can be prevented from deteriorating.

Fourth Embodiment

Figure 8:
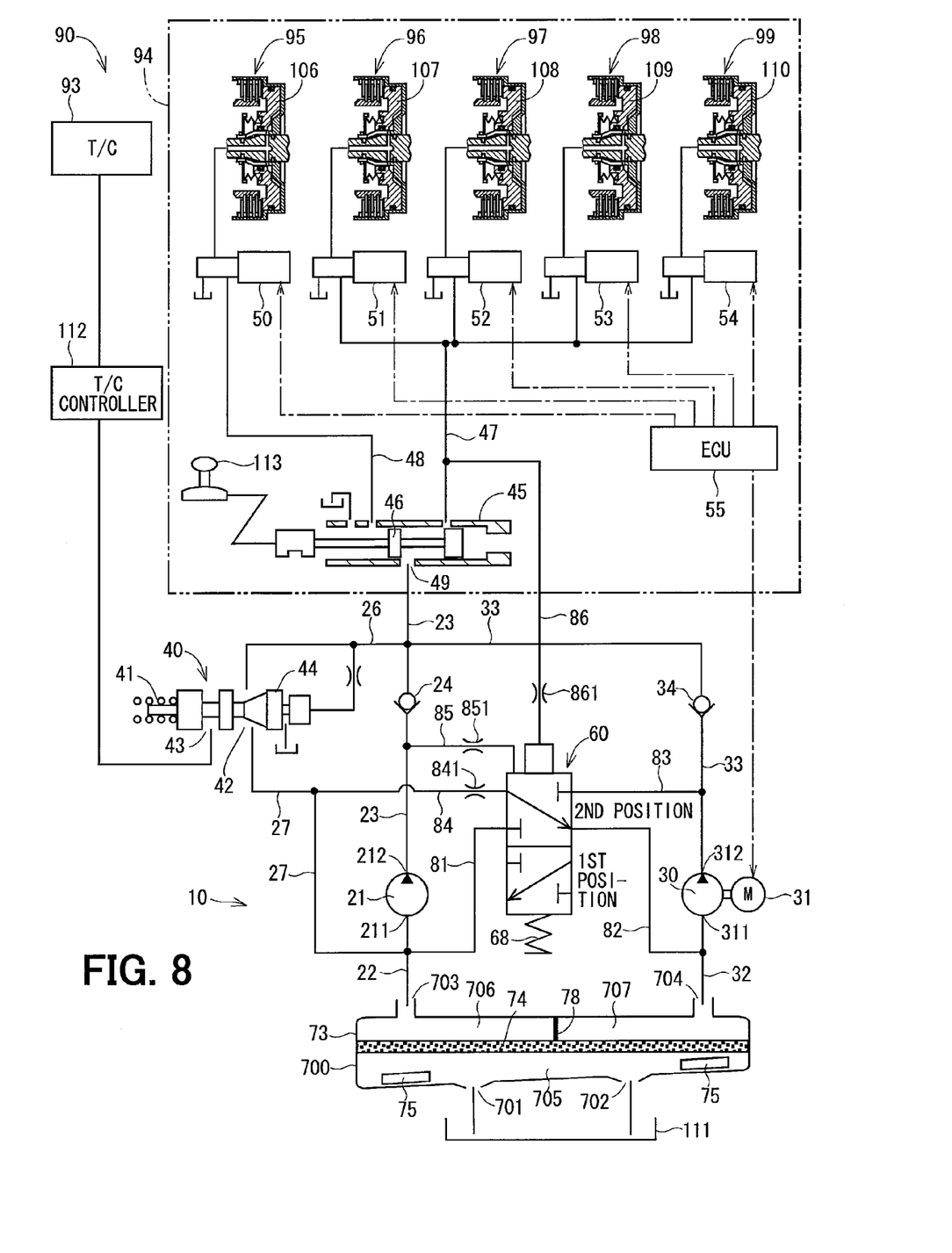
FIG. 8 is a schematic diagram showing an automatic transmission provided with an oil-pressure supply device according to a fourth embodiment of the present disclosure.

A fourth embodiment of the present disclosure will be described referring to FIG. 8. In the fourth embodiment, the first strainer 71 and the second strainer 72 described in the first to third embodiments are integrated. An integrated strainer 700 of the fourth embodiment includes a casing 73, a bulkhead 78, a filter element 74 and unwoven fabrics 75. The casing 73 has first and second oil inlet portions 701 and 702 communicating with an oil pan 111, a first oil outlet portion 703 communicating with a suction port 211 of a mechanical pump 21, and a second oil outlet portion 704 communicating with a suction port 311 of an electric pump 30. The filter element 74 is made of metallic mesh or unwoven fabric, for example. The filter element separates an inner space of the casing 73 into a dirty fluid room 705, a first clean fluid room 706 and a second clean fluid room 707. The dirty fluid room 705 communicates with the oil inlet portions 701, 702, and the first and second clean fluid rooms 706, 707 communicate with the oil outlet portions 703, 704 respectively. The bulkhead 78 separates between the first clean fluid room 706 and the second clean fluid room 707 to block a flow of the hydraulic oil therebetween. One of the unwoven fabrics 75 is located at or adjacent to a position directly under the first oil outlet portion 703 in the dirty fluid room 705, and another one of the unwoven fabrics 75 is located at or adjacent to a position directly under the second oil outlet portion 704 in the dirty fluid room 705. Foreign materials removed from the filter element 74 adsorbs to the unwoven fabrics 75. In the fourth embodiment, the bulkhead 78 is provided between the first clean fluid room 706 and the second clean fluid room 707 of the integrated strainer 700. Thus, multiple strainers can be thereby integrated, and a structure of the integrated strainer 700 can be simplified.

Although the present disclosure has been fully described in connection with the preferred embodiments thereof with reference to the accompanying drawings, it is to be noted that various changes and modifications as follows will become apparent to those skilled in the art.

In the above-described first embodiment, the electric pump 30 is driven before the engine 91 is stopped due to the idling stop operation, so that the oil pressure on the frontward-run friction elements 96 to 99 can be kept during the idling stop operation. However, the electric pump 30 may be driven to keep oil pressure on a start-moving friction element during the idling stop operation. The start-moving friction element receives oil pressure when the vehicle is started to run. Hence, the start-moving friction element is used for setting a gear to start the vehicle. In this case, the sixth branch passage 86 described in the first embodiment may be omitted, and a seventh branch passage may be provided. The oil pressure on the start-moving friction element is introduced into the sixth port 66 of the switching valve 60 through the seventh branch passage.

The automatic transmission 90 is not limited to the multistage planetary-gear transmission, and may be a multistage parallel-helical-gear transmission, a friction type continuously variable transmission, a hydromechanical continuously variable transmission or a continuously variable gear transmission. The hydraulic pistons 106 to 110 may be hydraulic cylinders that drive a groove-width changeable pulley of a belt-type continuously variable transmission, for example. The line-pressure control valve 40 is not limited to the pilot pressure-adjustment valve, and may be a direct operated valve, for example. A valve that controls hydraulic oil supplied to the hydraulic pistons 106 to 110 of the friction elements 95 to 99 is not limited to a direct operated valve such as a linear solenoid, and may be a pilot valve. The linear solenoids 50 to 54 are not limited to solenoids having portions driven electromagnetically, and may be solenoids having portions driven electrically. The automatic transmission 90 is arranged vertically as shown in FIG. 1 in the present disclosure, but may be arranged horizontally. The automatic transmission 90 may not include the torque converter 93. Accordingly, the present disclosure is not limited to the above-described embodiments, and can be applied to a variety of embodiments without departing from the scope of the disclosure.

Additional advantages and modifications will readily occur to those skilled in the art. The disclosure in its broader terms is therefore not limited to the specific details, representative apparatus, and illustrative examples shown and described.

What is claimed is:

1. An oil-pressure supply device for supplying hydraulic oil from an oil storage portion to a friction element or a torque converter of an automatic transmission for a vehicle, the oil-pressure supply device comprising:
    an oil-pressure control portion which controls a pressure of the hydraulic oil supplied to the friction element or the torque converter;
    a mechanical pump driven by an engine, the mechanical pump having a suction port through which the hydraulic oil is drawn from the oil storage portion, and a discharge port through which the hydraulic oil is discharged to the oil-pressure control portion;
    an electric pump driven by a motor, the electric pump having a suction port through which the hydraulic oil is drawn from the oil storage portion, and a discharge port through which the hydraulic oil is discharged to the oil-pressure control portion;
    a first filtration portion which traps foreign materials contained in the hydraulic oil drawn from the oil storage portion into the suction port of the mechanical pump;
    a second filtration portion which traps foreign materials contained in the hydraulic oil drawn from the oil storage portion into the suction port of the electric pump;
    a first branch passage branching from an oil passage that connects the suction port of the mechanical pump and the first filtration portion;
    a second branch passage branching from an oil passage that connects the suction port of the electric pump and the second filtration portion;
    a third branch passage branching from an oil passage that connects the discharge port of the electric pump and the oil-pressure control portion;
    a fourth branch passage through which the hydraulic oil surplus in operation of the friction element or the torque converter is discharged; and
    a switching portion configured to be set at a first position where the switching portion connects the first branch passage to the third branch passage and separates the second branch passage from the fourth branch passage, or be set at a second position where the switching portion connects the second branch passage to the fourth branch passage and separates the first branch passage from the third branch passage, wherein
    the switching portion is set at the first position when the foreign materials trapped by the first filtration portion are removed in a recovery of the first filtration portion, and
    the switching portion is set at the second position when the foreign materials trapped by the second filtration portion are removed in a recovery of the second filtration portion.

2. The oil-pressure supply device according to claim 1, further comprising a mode selection portion that is operated by a driver to select a transmission mode of the automatic transmission, wherein
    the switching portion is set at the second position when the mode selection portion selects a frontward-run mode,
    the switching portion is set at the second position when the mode selection portion selects a mode other than the frontward-run mode and when the engine is in operation, and
    the switching portion is set at the first position when the mode selection portion selects a mode other than the frontward-run mode and when the engine is stopped.

3. The oil-pressure supply device according to claim 2, wherein the electric pump is driven when the mode selection portion selects a mode other than the frontward-run mode and when the engine is stopped in a case where the first filtration portion is recovered.

4. The oil-pressure supply device according to claim 2, wherein
    the friction element includes a frontward-run friction element on which a pressure of the hydraulic oil is applied when the mode selection portion selects the frontward-run mode,
    the oil-pressure supply device further comprising:
    a fifth branch passage through which a pressure of the hydraulic oil discharged from the mechanical pump to the oil-pressure control portion is introduced into the switching portion; and
    a sixth branch passage through which a pressure of the hydraulic oil applied on the frontward-run friction element is introduced into the switching portion, wherein
    the electric pump is driven to supply a pressure of the hydraulic oil to the frontward-run friction element when the mode selection portion selects the frontward-run mode and when an idling stop operation is performed in a case where a vehicle speed is equal to or lower than a predetermined value,
    the switching portion is set at the second position when at least one of pressures of the hydraulic oil in the fifth branch passage and in the sixth branch passage is higher than a predetermined pressure, and
    the switching portion is set at the first position when the pressures of the hydraulic oil in the fifth branch passage and in the sixth branch passage are lower than a predetermined pressure.

5. The oil-pressure supply device according to claim 2, wherein
    the friction element includes a start-moving friction element on which a pressure of the hydraulic oil is applied when the mode selection portion selects the frontward-run mode and when the vehicle starts moving frontward,
    the oil-pressure supply device further comprising:

a fifth branch passage through which a pressure of the hydraulic oil discharged from the mechanical pump to the oil-pressure control portion is introduced into the switching portion; and a seventh branch passage through which a pressure of the hydraulic oil applied on the start-moving friction element is introduced into the switching portion, wherein the electric pump is driven to supply a pressure of the hydraulic oil to the start-moving friction element when the mode selection portion selects the frontward-run mode and when an idling stop operation is performed in a case where a vehicle speed is equal to or lower than a predetermined value, the switching portion is set at the second position when at least one of pressures of the hydraulic oil in the fifth branch passage and in the seventh branch passage is higher than a predetermined pressure, and the switching portion is set at the first position when the pressures of the hydraulic oil in the fifth branch passage and in the seventh branch passage are lower than a predetermined pressure.

6. The oil-pressure supply device according to claim 2, wherein the friction element includes a frontward-run friction element on which a pressure of the hydraulic oil is applied when the mode selection portion selects the frontward-run mode, the oil-pressure supply device further comprising:

a fifth branch passage through which a pressure of the hydraulic oil discharged from the mechanical pump to the oil-pressure control portion is introduced into the switching portion; and a sixth branch passage through which a pressure of the hydraulic oil applied on the frontward-run friction element is introduced into the switching portion, wherein the electric pump is driven to supply a pressure of the hydraulic oil to the frontward-run friction element when the mode selection portion selects the frontward-run mode and when an idling stop operation is performed in a case where a vehicle speed is equal to or lower than a predetermined value, the switching portion is set at the second position when a sum of pressures of the hydraulic oil in the fifth branch passage and in the sixth branch passage is equal to or higher than a predetermined pressure, and the switching portion is set at the first position when the sum of the pressures of the hydraulic oil in the fifth branch passage and in the sixth branch passage is lower than the predetermined pressure.

7. The oil-pressure supply device according to claim 1, further comprising:

an eighth branch passage through which the hydraulic oil discharged from the mechanical pump or from the electric pump to the oil-pressure control portion is introduced into the switching portion; and a hydraulic solenoid which controls a flow of the hydraulic oil flowing through the eighth branch passage for setting the switching portion at the first position or the second position.

8. The oil-pressure supply device according to claim 1, wherein the oil-pressure control portion includes a line-pressure control portion which controls a pressure of the hydraulic oil supplied to the friction element, and the line-pressure control portion discharges the hydraulic oil, which is surplus in the operation of the friction element, to the fourth branch passage.

9. The oil-pressure supply device according to claim 1, wherein the oil-pressure control portion includes a converter control portion which controls a pressure of the hydraulic oil supplied to the torque converter, and the converter control portion discharges the hydraulic oil, which is surplus in the operation of the torque converter, to the fourth branch passage.

10. The oil-pressure supply device according to claim 1, further comprising a flow-rate restriction portion which restricts a flow rate of the hydraulic oil flowing from the fourth branch passage through the switching portion and the second branch passage to the second filtration portion.

11. The oil-pressure supply device according to claim 1, wherein at least one of the first filtration portion and the second filtration portion includes:

a casing having a clean fluid room and a dirty fluid room;

an oil inlet portion through which the dirty fluid room of the casing communicates with the oil storage portion;

an oil outlet portion through which the clean fluid room of the casing communicates with the suction port of the mechanical pump or with the suction port of the electric pump;

a filter element provided between the dirty fluid room and the clean fluid room; and a foreign-material adsorption portion provided in the dirty fluid room so that foreign materials removed from the filter element adsorb to the foreign-material adsorption portion.

12. The oil-pressure supply device according to claim 11, wherein the foreign-material adsorption portion is made of magnet.

13. The oil-pressure supply device according to claim 11, wherein the foreign-material adsorption portion is made of unwoven fabric.

14. The oil-pressure supply device according to claim 1, wherein the first filtration portion and the second filtration portion are integrated with each other, and include:

a casing having a first clean fluid room, a second clean fluid room and a dirty clean room;

a bulkhead separating between the first clean fluid room and the second clean fluid room to block a flow of the hydraulic oil flowing between the first clean fluid room and the second clean fluid room;

an oil inlet portion through which the dirty fluid room of the casing communicates with the oil storage portion;

a first oil outlet portion through which the first clean fluid room of the casing communicates with the suction port of the mechanical pump;

a second oil outlet portion through which the second clean fluid room of the casing communicates with the suction port of the electric pump; and a filter element provided between the dirty fluid room and the first clean fluid room and between the dirty fluid room and the second clean fluid room.

15. The oil-pressure supply device according to claim 14, wherein the first filtration portion and the second filtration portion further includes a foreign-material adsorption portion provided in the dirty fluid room so that foreign materials removed from the filter element adsorb to the foreign-material adsorption portion.

16. The oil-pressure supply device according to claim 1, further comprising a mode selection portion that is operated by a driver to select a transmission mode of the automatic transmission, wherein the oil-pressure supply device is applied to a vehicle having an idling stop system that performs an idling stop operation in which the engine is stopped when the mode selection portion selects a frontward-run mode and when a vehicle speed is equal to or lower than a predetermined value, and the electric pump is activated before the engine is stopped due to the idling step operation.

* * * * *